US006471476B1

(12) United States Patent
Diels et al.

(10) Patent No.: US 6,471,476 B1
(45) Date of Patent: Oct. 29, 2002

(54) CENTRIFUGAL TRASH PUMP

(75) Inventors: Chad A. Diels, Hartford, WI (US); Daniel J. Domanski, Muskego, WI (US)

(73) Assignee: Wacker Corporation, Menomonee Falls, WI (US)

( * ) Notice: Subject to any disclaimer, the term of this patent is extended or adjusted under 35 U.S.C. 154(b) by 0 days.

(21) Appl. No.: 09/711,654

(22) Filed: Nov. 13, 2000

(51) Int. Cl.⁷ ............................................. F03D 00/00
(52) U.S. Cl. ........................ 416/1; 416/58.4; 416/58.6
(58) Field of Search ............................. 416/56.5, 56.1, 416/56.2, 56.3, 56.4, 206, 208, 196, 197, 213.1, 214.1, 128; 417/234

(56) References Cited

U.S. PATENT DOCUMENTS

| | | |
|---|---|---|
| 2,461,925 A | 2/1949 | Rupp |
| 2,945,448 A | 7/1960 | Frederick |
| 4,052,133 A | 10/1977 | Yeater |
| 4,129,402 A | 12/1978 | Eberhardt |
| 4,419,048 A | 12/1983 | Pilachowski et al. |
| 4,637,778 A * | 1/1987 | Pollari ....................... 415/53 R |
| 4,844,687 A | 7/1989 | Korthaus |
| 4,932,837 A | 6/1990 | Rymal |
| 5,100,289 A * | 3/1992 | Caoduro .................... 415/56.5 |

OTHER PUBLICATIONS

Wacker Corporation Manual, Pump Principles Selection and Application for Construction Industry.

* cited by examiner

*Primary Examiner*—Edward K. Look
*Assistant Examiner*—J M McAleenan
(74) *Attorney, Agent, or Firm*—Boyle Frederickson Newholm Stein & Gratz S.C.

(57) ABSTRACT

A centrifugal pump includes a volute and an impeller that are disposed in a pump chamber accessible through an access opening in the front wall of the pump's casing. The access opening is normally closed by a cover attachable to a front wall of the casing. The volute is attached to the cover by fasteners accessible from the outside of the cover so as to permit the cover and volute to be removed either as a unit or individually. The volute therefore is more easily accessed and removed than conventional pump volutes. In order to maximize self-priming and suction lift capability, the volute includes a discharge duct that converts substantially circular flow at the inlet of the discharge duct to substantially tangential flow at the outlet of the discharge duct, thereby maximizing the separation of air from the discharged liquid stream and minimizing the amount of entrained air in that portion of the discharged liquid stream that is recirculated to a recirculation inlet of the self-priming pump. The resultant pump is particularly well-suited for use as a trash pump.

38 Claims, 7 Drawing Sheets

CENTRIFUGAL TRASH PUMP

BACKGROUND OF THE INVENTION

1. Field of the Invention

The invention relates to centrifugal pumps and, more particularly, relates to a centrifugal pump having a volute which has improved discharge characteristics when compared to traditional volutes and/or which is easily removable for pump maintenance or cleaning. The invention additionally relates to a method of assembling or disassembling such a pump and to a method of its use.

2. Discussion of the Related Art

Centrifugal pumps, sometimes known as kinetic energy pumps, are widely used in a variety of fluid handling applications. An internal or external power source drives an impeller to draw liquid into a pump chamber and to expel liquid from the pump chamber under pressure. In the most typical configuration, liquid flows into an axial inlet of the impeller, is forced by the impeller through a toroidal flow path formed by a volute surrounding the impeller, and is discharged from the volute and out of the pump.

The volute sometimes needs to be removed from the pump chamber to permit repair or replacement of the volute or the impeller or to permit cleaning of the pump chamber. This need is particularly evident in the case of a so-called "trash pump," which is configured to pump water or other liquids having a relatively high percentage of comparatively large-diameter solids dispersed in them. Trash pumps are used in a variety of agricultural, construction, and industrial applications. The most common trash pumps have a discharge diameter ranging from two inches to six inches and are configured to pump fluids having solids therein that are half as large as the discharge orifices. Hence, a three-inch trash pump is capable of pumping liquids having entrained solids of a diameter of one and a half inches.

Trash pumps have a tendency to become clogged with foreign matter. Some trash pumps therefore incorporate measures to provide access to the interior of the pump chamber for the purposes of unclogging it. This access is usually provided by way of an access opening that is large enough to permit the volute to be removed from the pump chamber. The access opening is closed during normal operation of the pump by a cover that is mounted on the pump casing by knobs or other user-friendly fasteners that permit the cover to be quickly removed in the field to provide access to the pump chamber interior.

Some volutes are formed integrally with the wall of the pump chambers. Pumps of this design are difficult to clean because there is no way to separate the volute from the pump chamber walls to dislodge materials lodged between them. In order to avoid this problem, the volutes of many trash pumps are removable to facilitate cleaning and maintenance. The volute of the typical trash pump of this type is bolted to the cover so as to permit the cover and the volute to be removed as a unit. However, the volute is attached to the cover from the inside and, therefore, must be removed with the cover. This construction can be problematic when the pump is clogged with materials lodged between the walls of the pump chamber and the volute because the lodged materials tend to jam the volute in place, severely inhibiting its removal from the pump chamber. The operator of a clogged pump may find himself in an unpalatable situation in which the pump is so badly clogged he cannot remove the cover/volute subassembly from the pump to dislodge the clogged materials. In this case, the pump has to be removed from the field for servicing.

Some manufacturers have attempted to solve this problem by not affixing the volute to the cover. The volute instead is simply held in place within the pump chamber by mating surfaces on the cover and the pump casing. This arrangement overcomes the problem of preventing cover removal when the pump is clogged, but creates a new problem of its own. Specifically, if the cover is removed when the volute is not lodged in place with the chamber, the volute may fall out of the pump casing before the operator is ready to deal with it, risking damage to the volute and/or injury to the operator.

The need therefore has arisen to provide ready access to the pump chamber of a trash pump or the like, even if the pump is severely clogged with debris, without fear of dropping the pump's volute.

Another feature of trash pumps and many other centrifugal pumps is that they are "self-priming." This term is a misnomer because all centrifugal pumps must be primed, that is, at least partially filled with water, before they can operate on their own because they cannot pump air. As a result, unless the pump is located below the water source and water can flow down to the pump chamber by gravity, liquid must be manually poured into the pump chamber before operation. "Self-priming" pumps are those that have an external or internal water reservoir which, when filled with liquid, negates the need for continuous manual priming during periods of low flow. Self-priming capability is enhanced in the typical centrifugal pump through the use of a flapper valve or other one-way valve. The one-way valve prevents flow out of the suction inlet from the pump chamber from the suction inlet and, therefore, assures that the pump chamber will remain full or nearly full during periods of inactivity or low flow.

Self-priming is particularly important in applications in which liquid flow rates into the pump often drop below the minimum discharge rate of the pump. In this instance, when air enters the suction hose for the pump, the pump stops pumping. However, the residual water in the pump chamber primes the pump until the hose is again filled with water. Pumping then resumes and will continue until air again enters the inlet hose.

Trash pumps and many other centrifugal pumps use the so-called "recirculation method" for self-priming. These pumps incorporate a recirculation port in the volute that is too small to feed the impeller all of the water that it is capable of handling. As a result of this and other aspects of the volute's configuration, air is drawn from the suction opening of the pump by the impeller. The resultant mixture of air and water is repeatedly discharged by the impeller and into the surrounding pump chamber. The water and air bubbles separate in the pump chamber so that the majority of the air is discharged from the pump chamber. The liquid returning to the recirculation port therefore is relatively free of air and increases the density of the fluid flowing through the volute, hence increasing the effectiveness of the pump. The cycle continues until enough air is purged from the suction hose to create a sufficient vacuum to draw water into the pump chamber.

Several factors influence a centrifugal pump's performance. These factors include its maximum discharge capacity, its maximum total head, and its maximum total suction lift. Volute features that affect maximum discharge capacity and maximum total head are controlled by well-known mathematical calculations. However, volute features that maximize suction lift ability and priming ability are subject to more empirical determinations that have yet to be optimized. Hence, while many self-priming centrifugal pumps use baffles and other relatively convoluted structures within the pump chamber to attempt to enhance the pump's self-priming capability, there is still considerable room for improvement.

The need therefore has arisen to provide a centrifugal pump volute that improves the pump's maximum suction lift capability and provides for a higher prime rate.

SUMMARY OF THE INVENTION

In accordance with the first aspect of the invention, a volute of a centrifugal pump and an adjacent access cover are fastened to one another and to the associated pump casing so as to permit the cover and the volute to be removed either as a unit or individually, depending upon operator preference and the prevailing circumstances.

Preferably, the fasteners comprise volute fasteners that fasten the cover to the volute and cover fasteners that fasten the cover to the pump casing. Both types of fasteners are accessible from an exterior surface of the cover. The volute fasteners may comprise bolts that extend through bores in the cover and that are threaded into tapped bores in the volute. These fasteners preferably further comprise cover fasteners that are fastened to the pump casing and that are accessible from an exterior of the pump to remove the cover from the pump casing. In order to facilitate field maintenance by minimizing the need to use tools to assemble or disassemble the pump, the cover fasteners preferably 1) cooperate with notches in the cover and 2) can be loosened and swung away from the notches without removing the cover fasteners from the pump casing, thereby permitting removal of the cover from the pump casing. For instance, each cover fastener may include 1) a threaded rod that is attached to the pump casing and 2) a knob threadedly attached to the threaded rod, each of the knobs being generally T-shaped and having 1) a first leg threaded onto the rod and 2) a second leg extending at least generally perpendicularly from the first leg and having a pair of longitudinally-spaced, generally triangular thumb engagement portions.

In accordance with another aspect of the invention, a pump volute includes a discharge that is configured to provide improved maximum suction lift capacity and improved self-priming capability. The pump has a pump casing which has a pump chamber formed therein, a rotatable impeller which is housed in the pump chamber, and a volute housed in the pump chamber. The volute has an inner radial edge which is at least generally circular and which surrounds the impeller, an outer radial surface which is at least general toroidal in shape, a radial outlet in fluid communication with an outlet of the pump chamber, and a recirculation inlet in fluid communication with the radial outlet. The radial outlet is formed from an outlet of a discharge duct. The discharge duct is dimensioned and configured to discharge a liquid stream from the outlet thereof in a flow pattern that is at least substantially tangential to the inner radial peripheral edge.

Preferably, the discharge duct has inner and outer radial walls. The inner radial wall has an outer end portion that extends at least substantially linearly and at least substantially tangentially to the inner radial peripheral edge. The outer radial wall has an outer end portion that extends at least substantially linearly and at least substantially tangentially to the inner radial peripheral edge. The outlet of the discharge duct preferably faces generally upwardly and is inclined downwardly from the inner radial wall of the discharge duct to the outer radial wall of the discharge duct.

In accordance with other aspects of the invention, improved methods are provided of 1) assembly or disassembling a pump so as to provide access to a pumping chamber thereof, even if the chamber is clogged with debris, and/or 2) self-priming a centrifugal pump.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

1. Resume

Pursuant to a preferred embodiment of the invention, a centrifugal pump includes a volute and an impeller that are disposed in a pump chamber accessible through an access opening in the front wall of the pump's casing. The access opening is normally closed by a cover attachable to a front wall of the casing. The volute is attached to the cover by fasteners accessible from the outside of the cover so as to permit the cover and volute to be removed either as a unit or individually. The volute therefore is more easily accessed and removed than conventional pump volutes. In order to maximize self-priming and suction lift capability, the volute includes a discharge duct that converts substantially circular flow at the inlet of the discharge duct to substantially tangential flow at the outlet of the discharge duct, thereby maximizing the separation of air from the discharged liquid stream and minimizing the amount of entrained air in that portion of the discharged liquid stream that is recirculated to a recirculation inlet of the self-priming pump. The resultant pump is particularly well-suited for use as a trash pump.

2. Pump Overview

The present invention is applicable to a wide variety of centrifugal pumps used in a variety of applications including liquid pumping applications, slurry pumping applications, etc. It is particularly well-suited for use as trash pump, which will now be disclosed as the preferred embodiment of the invention.

Figure 1:
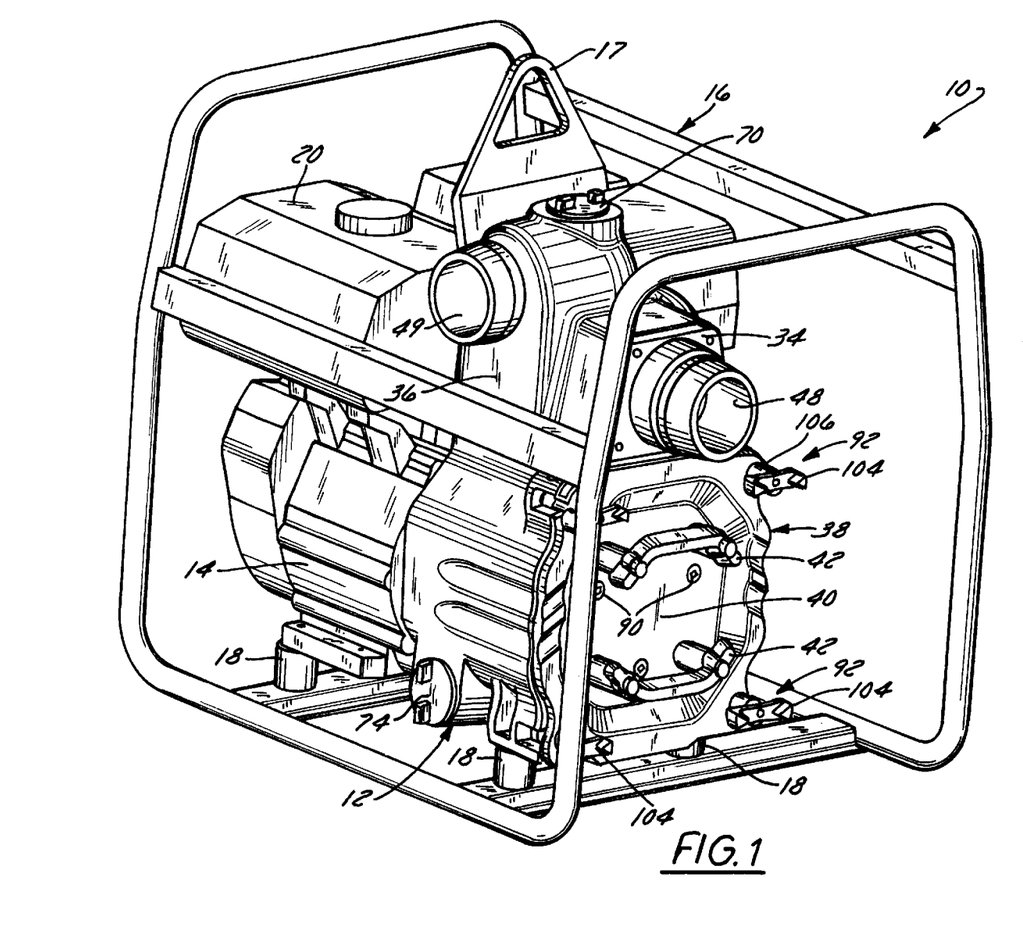
FIG. 1 is a perspective view of a trash pump constructed in accordance with a preferred embodiment of the invention.

Referring now to FIG. 1, a trash pump 10 constructed in accordance with the present invention comprises a so-called "engine driven centrifugal trash pump." The pump 10 is configured to be self-contained so as to be usable in the field without any external power source. It includes a pump casing 12 and an engine 14 mounted as a unit on a support/lift frame 16 via shock mounts 18. The frame 16 is configured to support the pump 10 and to protect it during use and transport. In addition, a suspension bracket 17 is configured to permit the pump 10 to be transported from worksite to worksite. The suspension bracket 17 is disposed between the pump casing 12 and the engine 14 and is attached to the pump casing 12.

Figure 5:
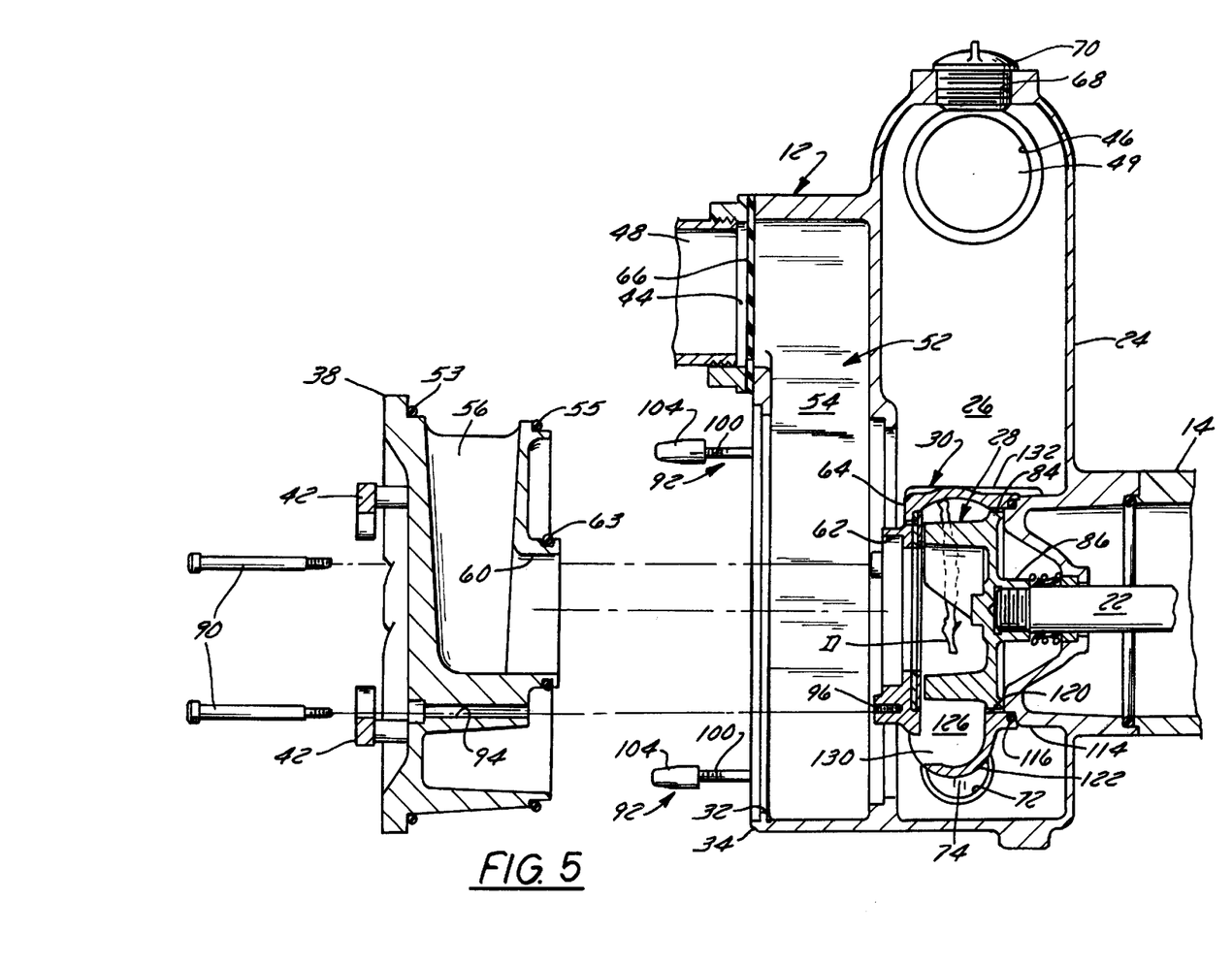
FIG. 5 corresponds to FIG. 4 and illustrates removal of the cover from the pump casing while retaining the volute in the pump casing.

The engine 14 may comprise any device capable of transmitting torque to the pump's impeller as detailed below. In the illustrated embodiment the engine 14 is a gasoline-powered engine supplied with fuel from a tank 20. The engine 14 mounted adjacent a rear wall 24 of the pump casing 12 and has an output shaft 22 extending through a rear wall 24 of the pump casing 12 as best seen in FIG. 5. The size of the engine 14 will vary with the size of the pump. Typically, a pump having a two-inch diameter discharge orifice will be powered by a 5.5 horsepower engine, and a pump having a three-inch discharge orifice will be powered by a 8 horsepower engine.

Figure 2:
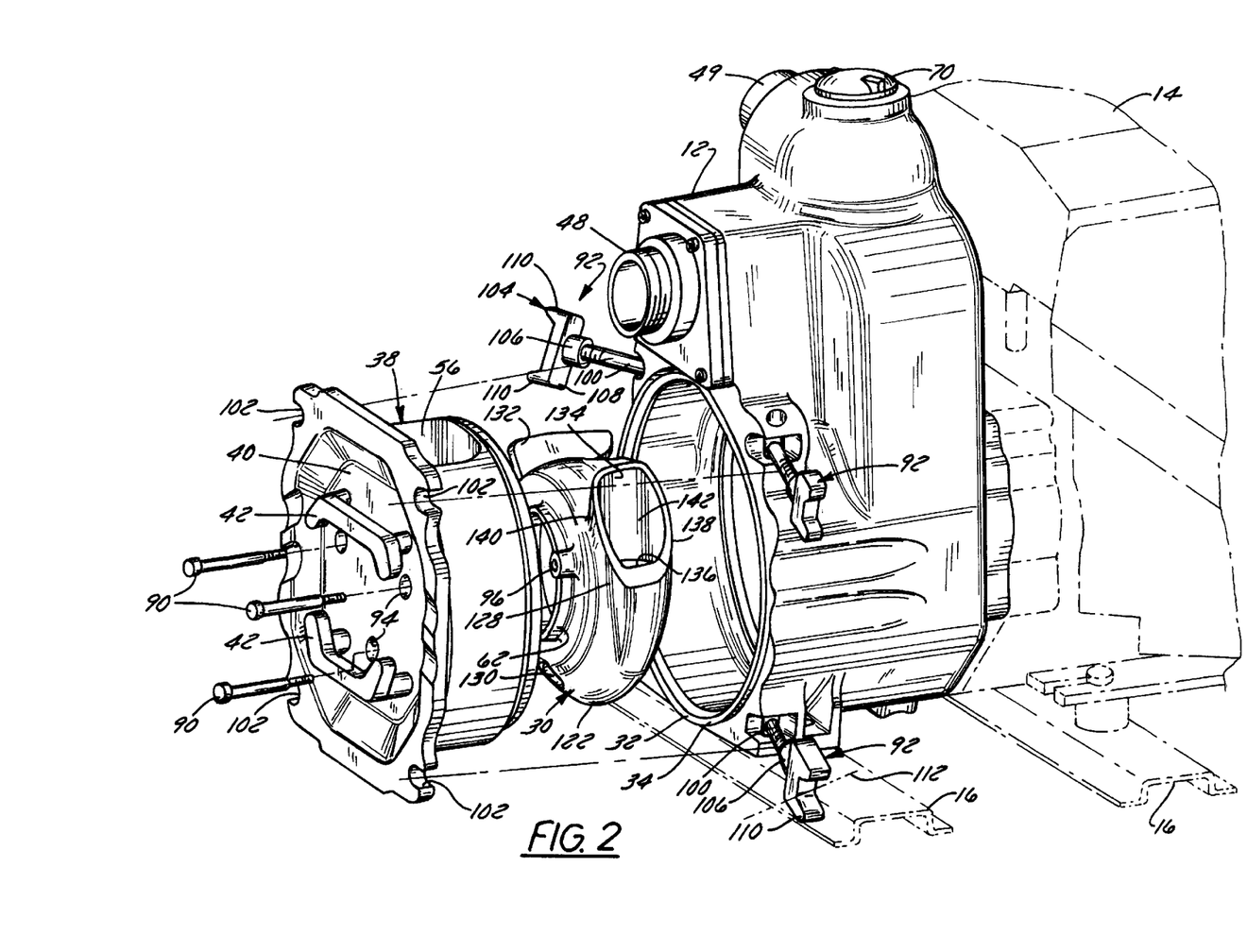
FIG. 2 is a partially exploded perspective view of a portion of the pump, showing the cover and volute of the pump removed from the pump casing.
Figure 3:
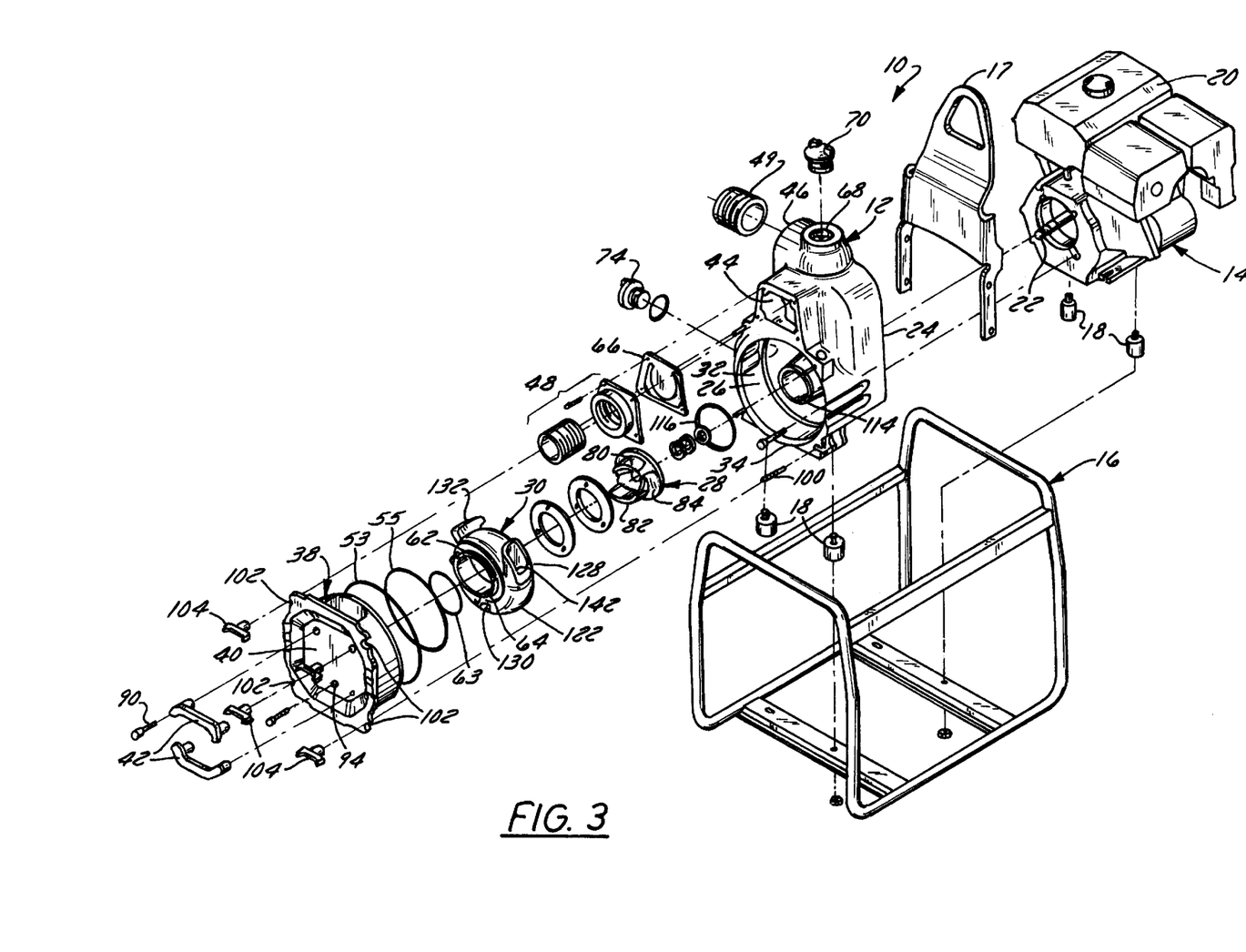
FIG. 3 is an exploded perspective view of the pump in FIG. 1.

Referring to FIGS. 1–3, the pump casing 12 has an internal pump chamber 26 that houses an impeller 28 and a volute 30. Access to the volute 30 and impeller 28 is provided via an access opening 32 formed in a front wall 34 of the pump casing 12 disposed opposite the rear wall 24. The front access opening 32 is normally closed by a cover 38. The cover 38, which extends into the pump chamber 26 through the access opening 32, has a front face 40 that is generally co-planar with the front wall 34 of the pump casing 12. If desired, handles 42 can be bolted or otherwise attached to the front face 40 of the cover 38 to facilitate handling of the cover 38.

Figure 6:
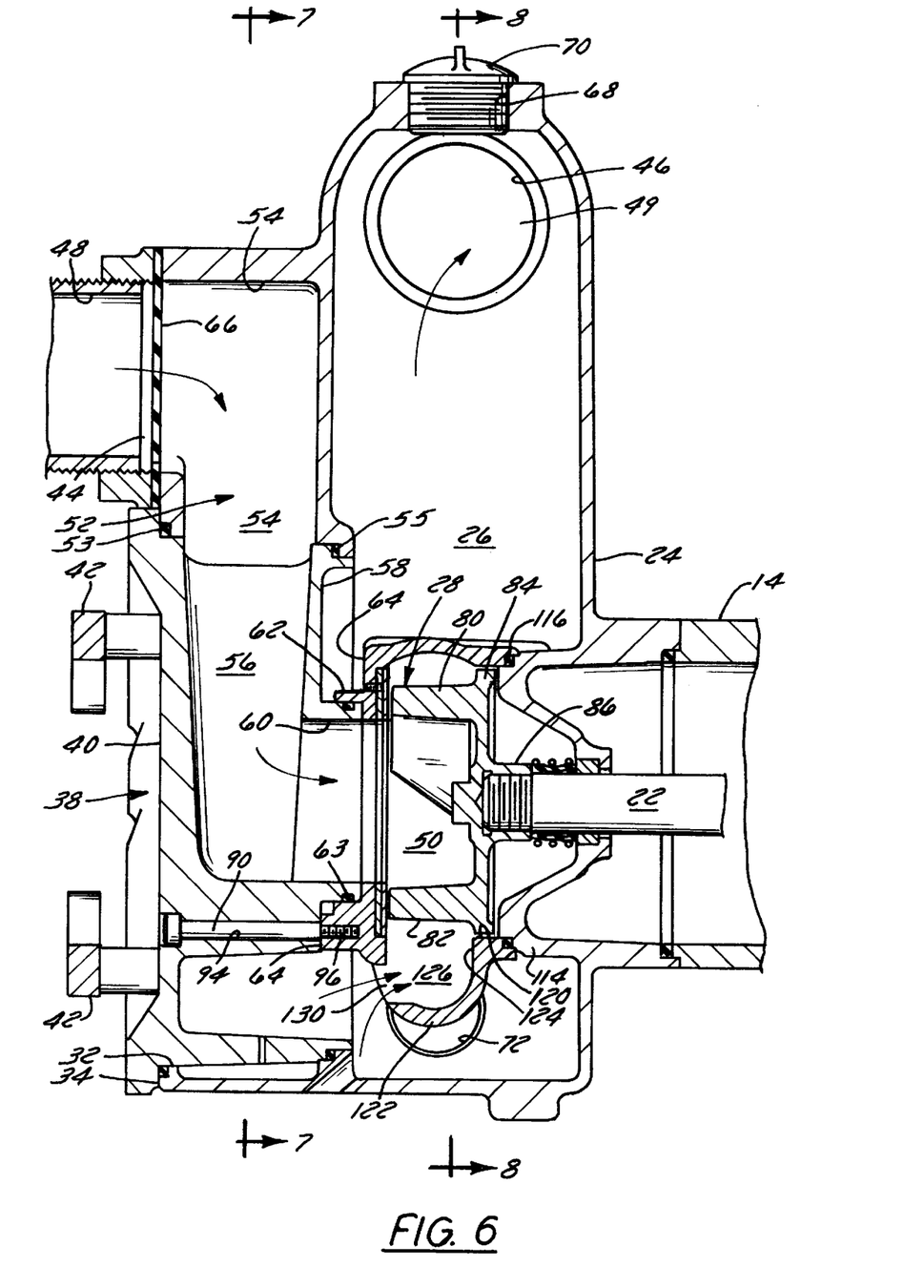
FIG. 6 is a sectional side elevation view of the pump casing and related components of the pump.

Referring to FIGS. 3–6, the pump chamber 26 has a fluid inlet 44 and a fluid outlet 46, both positioned above the impeller 28 and volute 30 as seen in FIG. 6. In the illustrated embodiment, the inlet 44 extends axially from an external fitting 48, through the front wall 34 of the pump casing 12, and into the pump chamber 26. The outlet 46 extends radially from a fitting 49, through a sidewall 36 of the casing 12, and into the pump chamber 26. As best seen in FIG. 6, the inlet 44 is connected to an axial inlet 50 of the impeller 28 by an inlet passage 52. The inlet passage 52 includes an upper, vertical portion 54 and a lower portion 56. Upper portion 54 is located within the pump casing 12 above the cover 38. Lower portion 56 is formed in a rear wall 58 of the cover 38. It is generally L-shaped, having a vertical leg and a horizontal leg. The vertical leg mates with the upper portion 54. The horizontal leg, formed from a circular boss 60 on the rear wall 58 of the cover 38, engages a circular flange 62 on a front axial surface 64 of the volute 30 and seals against flange 62 with the aid of a ring seal 63. Leakage through the access opening 32 is prevented by ring seals 53 and 55 disposed between the cover 38 and the periphery of the access opening 32.

Still referring to FIGS. 3 and 6, a flapper valve 66 is disposed at the inlet 44. The flapper valve 66 acts as a check valve that prevents water from flowing out of the pump chamber 26 through the inlet 44 between pumping operations or when the liquid flow rate into the inlet 44 drops below the minimum discharge rate of the pump 10. In addition, a priming orifice 68 is formed in the top of the pump casing 12 for the introduction of priming fluid prior to a pumping operation. The priming orifice is closed by a plug 70 during normal operation of the pump 10. Finally, a drain opening 72 is formed in the bottom of the pump chamber 26 and is normally closed by a plug 74.

Figure 4:
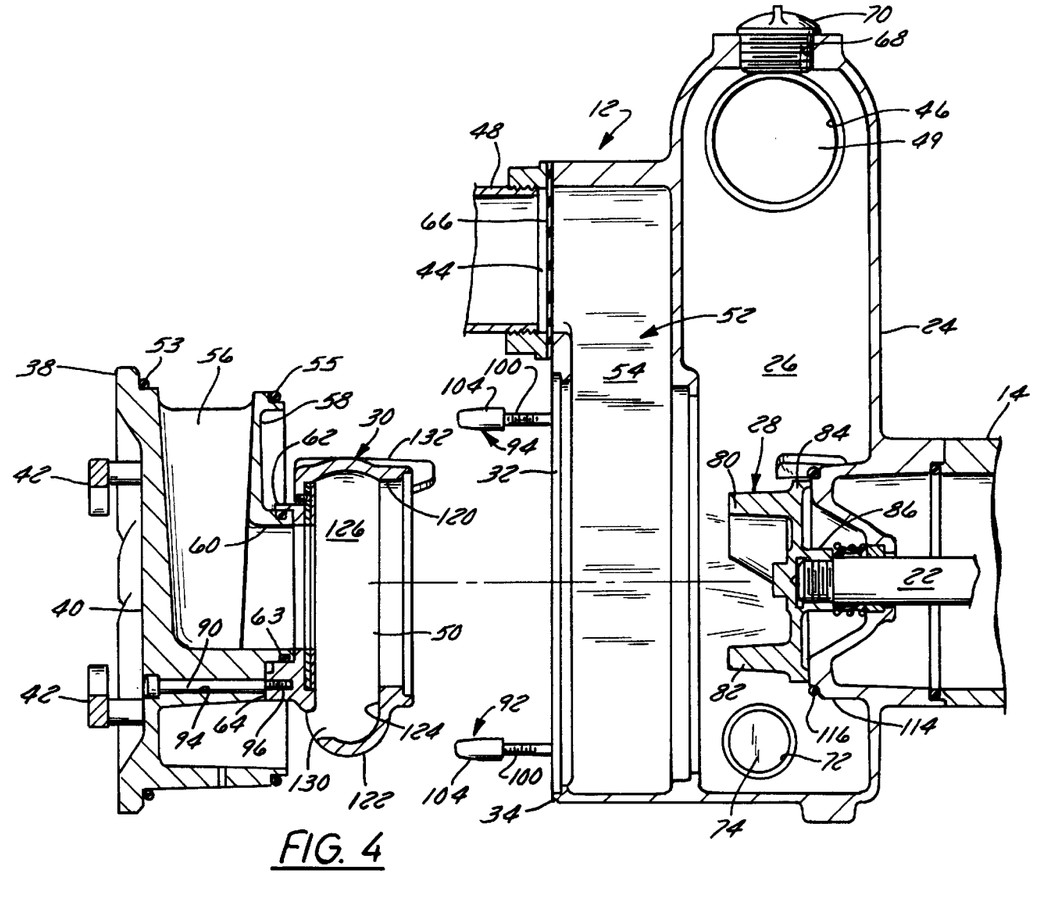
FIG. 4 is a partially sectional side elevation view of the pump casing and related components of FIG. 3, showing removal of the cover and the volute of the pump from the pump casing as a unit.

The impeller 28 may comprise any structure capable of rotating with the engine output shaft 22 and of forcing fluids and the entrained materials to flow through the volute 30. Referring to FIGS. 4–6, the illustrated impeller 28 has two blades 80 and 82 extending forwardly from a circular rear plate 84. The blades 80 and 82, which are generally arcuate in shape and are surrounded by the volute 30, direct fluid flow through the volute 30 as detailed in Section 3 below. A threaded boss 86, extending rearwardly from the plate 84, is affixed to the engine output shaft 22 to couple the engine 14 to the impeller 28.

Referring now particularly to FIGS. 3–5, the cover 38 is connected to the volute 30 by volute fasteners 90 and to the pump casing 12 by cover fasteners 92, all of which are accessible from the exterior of the pump casing 12. The volute fasteners 90 normally fasten the cover 38 and volute 30 together as a unit, but can be selectively removed from the exterior surface 40 of the cover 38 to permit the cover 38 to be removed from the pump casing 12 independently of the volute 30. The volute fasteners 90 comprise lag bolts, each of which extends through an associated counter-bored opening 94 formed through the cover 38 and into a mating tapped bore 96 formed in the outer axial surface 64 of the volute 30. Three bolts 90 are provided in the illustrated embodiment.

The cover fasteners 92 are configured to permit removal of the cover 38 and the volute 30 as a unit from the pump 10 without the use of any tools. Specifically, as best seen in FIG. 3, each of the fasteners 92 comprises a threaded rod 100 attached to the pump casing 12 at a location behind the front wall 34 of the casing 12 and extending forwardly from the front wall 34. Each of the rods 100 is swingable into and out of a notch 102 in a respective corner of the cover 38. Knobs 104 can be hand-threaded onto the rods 100 to clamp the cover 38 against the pump casing 12. Preferably, each of the knobs 104 is generally T-shaped, having (1) a first, internally threaded leg 106 threadable onto the rod 100 and (2) a second leg 108 extending perpendicularly from the first leg 106. The second leg 108 has a pair of longitudinally spaced, generally triangular thumb engagement portions 110. Engagement portions 110 serve both as ergonomic contact points for the operator to grasp and, if necessary, as engagement surfaces for insertion of a screwdriver or similar instrument along a line 112 in FIG. 2.

In order to mount the volute 30 and cover 38 on the pump casing 12, the cover 38 and volute 30 are first fastened together by inserting the bolts 90 through the bores 94 in the cover 38 from the outer surface 40 of the cover 38 and threading them into the tapped bores 96 in the volute 30, thereby forming a volute/cover subassembly. That subassembly is then positioned over the access opening 32 in the pump casing 12 as a unit so that the volute 30 is positioned within the pump chamber 26 in a surrounding relationship with respect to the impeller 28 and is sealed against a boss 114 on the rear wall 24 of the pump casing 12 by a seal 116 as best seen in FIG. 6. The cover fasteners 92 are then swung into the notches 102 in the cover 38, and the knobs 104 are threaded onto the rods 100 of the fasteners 100 to secure the cover 38 and volute 30 in place against the front wall 34 of the pump casing 12 with the cover seals 53 and 55 (best seen in FIG. 3) clamped between them.

To remove the cover 38 and volute 30 as a unit in order to maintain or replace the volute 30 or to otherwise provide access to the interior of the pump chamber 26, the knobs 104 are simply loosened, and the cover fasteners 92 are. swung out of the notches 102 in the corners of the cover 38. The user then grasps the handles 42 and removes the cover 38 and the volute 30 from the pump casing 12 as a unit as seen in FIG. 4.

If, on the other hand, it is desired to remove the cover 38 without removing the volute 30 (as may be the case of the volute 30 is jammed in place by debris "D" clogging the pump chamber 26 as seen in FIG. 5), the operator can remove the cover 38 from the pump casing 12 without removing the volute 30 by first removing the volute fasteners 90 from the outside as seen in FIG. 5. The cover 38 can then be removed as discussed before to provide access to the interior of the pump chamber 26 without removing the volute 30 from the pump chamber 26.

3. Construction and Operation of Volute

Figure 7:
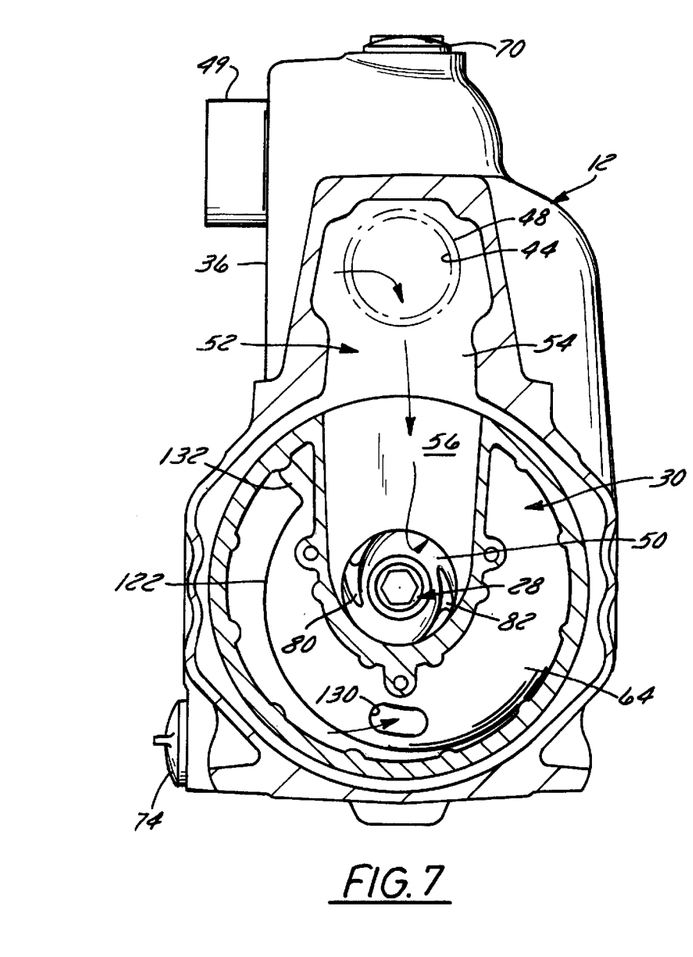
FIG. 7 is a sectional end elevation view taken generally along the lines 7—7 in FIG. 6.
Figure 8:
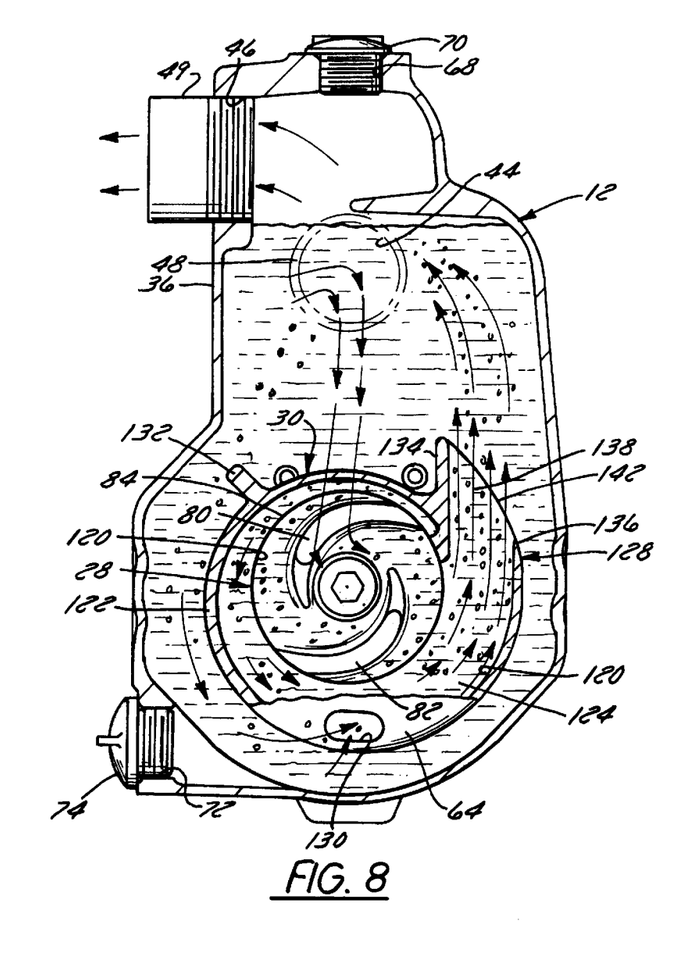
FIG. 8 is a sectional end elevation view taken generally along the lines 8—8 in FIG. 6.

As discussed above, the volute 30 1) is configured to increase the pump's self-prime rate and to maximize the pump's suction lift capability, 2) while still permitting the volute 30 to be removed from the pump chamber 26. Referring to FIGS. 6–8, the volute 30 of the illustrated embodiment is self-contained, having a circular radial inner edge 120, a generally toiroidal outer radial peripheral surface 122, the above described outer axial surface 64, and an open inner axial surface 124. The impeller 28 fits within the opening formed by the circular inner edge 120. A diverging chamber 126 is defined at its inner boundary by the circular inner edge 120 and at its outer boundary by the outer radial peripheral surface 122 of the volute 30. The chamber 126 is generally toroidal in shape so as to form a flow path for pumped liquids that increases in cross-sectional area from its inner end to its outer end. The chamber 126 terminates in a discharge duct 128 extending tangentially from the circular edge 120 as detailed below. A recirculation inlet 130 is formed in the outer axial surface 64 of the volute 30. It has a diameter that is considerably smaller than the diameter of the volute's discharge orifice 142 (detailed below), thereby enabling the so-called "recirculation method" of self-priming. Finally, a baffle or deflector 132 extends outwardly from the outer radial peripheral surface 122 at a location between the discharge duct 128 and the recirculation inlet 130 in the direction of fluid flow for reasons detailed below.

Referring to FIGS. 4–8, the discharge duct 128 is configured to maximize the separation between the liquid being pumped and any entrained air by discharging the pumped fluid at least primarily tangentially to the circular inner edge 120 as opposed to at least primarily circularly, as is usually the case with centrifugal pumps. The discharge duct 128 is also formed integrally with the volute 30 so as to permit easy removal of the entire volute 30 from the pump 10 for pump chamber cleaning, etc. It has inner and outer radial walls 134 and 136 and inner and outer axial walls 138 and 140. The inner and outer axial walls 138 and 140 extend in parallel with one another and with the inner and outer axial surfaces 124 and 64 of the volute 30. The inner radial wall 134 extends tangentially and linearly from the circle circumscribed by the inner radial edge 120 of the volute 30. The outer radial wall 136 preferably extends at least generally linearly and at least generally parallel with the inner peripheral wall 134 at its outer end, but is curved at its inner end at an angle that at least generally matches the angle of curvature of the outer surface 124 of the associated portion of the volute 30. As best seen in FIG. 8, a discharge orifice 142 of the discharge duct 128 is inclined, preferably arcuately, downwardly and outwardly from the inner radial wall 134 of the discharge duct 128 towards the outer radial wall 136.

In use, if, at any time during operation of the pump 10, air is drawn into the pump from a hose to cause the water level in the pump chamber 26 to drop beneath the level of the inlet 44 as seen in FIG. 8, air will enter the pump chamber 26 and the pumping action will stop, but the impeller 28 will continue to rotate. This impeller rotation forces a fluid in the form of air or a liquid that is heavily laden with air into the volute passage 126. The fluid in the passage 126 is combined with a denser liquid stream as detailed below and directed into the discharge duct 128, where the primarily circular flow at the inlet of the discharge duct 128 is converted to primarily tangential flow at the discharge orifice 142. As seen schematically in FIG. 8, at least a portion of the discharged stream flows back around the exterior of the volute 30, while a relatively large percentage of the discharged air is ejected from the chamber 26 through the outlet 46. The recirculated fluid stream therefore has substantially less entrained air than the incoming fluid stream. The baffle 132 further separates air from the recirculated stream before the recirculating liquid reaches the recirculation inlet 130. More specifically, the upwardly-facing discharge duct 128 produces a water fountain effect that causes the recirculating water to fall down around the baffle 132 to further aid in the separation of air from the water. The portion of the recirculating fluid stream that flows into the recirculation inlet 130 of the volute 30 therefore contains substantially less entrained air than the remaining portion that flows around the volute 30 and bypasses the recirculation inlet 130. The combined liquid stream in the chamber 126, having a relatively high density and therefore being more readily pumpable than a fluid stream having a larger percentage of entrained air, is then discharged at least primarily tangentially through the discharge duct 128 so that, once again, the majority of the entrained air in the combined stream is discharged from the pump chamber 26 rather than being recirculated. This continuous pumping and recirculation process is repeated until enough air has been purged from the inlet opening 44 to draw fluid into the pump chamber 26, at which point self-priming is complete and normal pumping action begins or resumes.

Many changes and modifications may be made to the present invention without departing from the spirit thereof. For instance, several different fastener arrangements could be used to fasten the pump cover 38 and volute 30 to one another and to fasten the cover 38 to the casing 12, so long as the pump cover 38 and volute 30 can be removed from the pump casing 12 either individually or as a unit. Similarly, several different discharge duct configurations could be used to convert the primarily circular flow of the fluid entering the discharge duct 128 to primarily tangential flow at the discharge opening 142. In addition, depending on the application, the discharge duct could be inclined relative to the vertical plane. The duct outlet also need to point vertically as illustrated, but could instead be inclined substantially from a vertical plane. In addition, the length of the discharge duct could vary from application to application or even within applications.

We claim:

1. A pump comprising:
   (A) a pump casing which has a pump chamber formed therein;
   (B) a rotatable impeller which is housed in said pump chamber;
   (C) a volute which is housed in said pump chamber; and
   (D) a cover which is attached to, said pump casing and to said volute by fasteners that can be selectively removed to 1) permit said cover and said volute to be removed from said pump casing as a unit and 2) permit said cover to be removed from said pump casing while leaving said volute in said pump chamber.

2. A pump as recited in claim 1, wherein said pump comprises a centrifugal pump the impeller of which has an axial inlet and a radial outlet.

3. A pump as recited in claim 2, wherein said pump comprises a trash pump configured to pump a liquid having solids dispersed therein.

4. A pump as recited in claim 1, wherein said fasteners comprise volute fasteners that fasten said cover to said volute and that are accessible from an exterior surface of said cover to remove said cover from said volute.

5. A pump as recited in claim 4, wherein said volute fasteners comprise bolts that extend through bores in said cover and that are threaded into tapped bores in said volute.

6. A pump as recited in claim 4, wherein said fasteners further comprise cover fasteners that are fastened to said pump casing and that are accessible from an exterior of said pump to remove said cover from said pump casing.

7. A pump as recited in claim 4, wherein said cover fasteners 1) cooperate with notches in said cover and 2) can be loosened and swung away from said notches without removing said cover fasteners from said pump casing, thereby permitting removal of said cover from said pump casing.

8. A pump as recited in claim 7, wherein each of said cover fasteners includes 1) a threaded rod that is attached to said pump casing and 2) a knob threadedly attached to said threaded rod, each of said knobs being generally T-shaped and having 1) a first leg threaded onto said rod and 2) a second leg extending at least generally perpendicularly from said first leg and having a pair of longitudinally-spaced, generally triangular thumb engagement portions.

9. A pump as recited in claim 1, wherein said pump is a self-priming centrifugal pump, and wherein said volute has 1) an inner radial peripheral edge that is at least substantially circular in shape and that surrounds said impeller, 2) an outer radial peripheral surface that is at least generally toiroidal in shape, and 3) a discharge duct that extends tangentially from said inner radial peripheral surface through a distance that is sufficient to convert fluid flow from a pattern that is at least primarily circular at an inlet of said discharge duct to a pattern that is at least primarily tangential to said inner radial peripheral edge at said outlet of said discharge duct.

10. A centrifugal trash pump comprising:
    (A) a pump casing which has a pump chamber formed therein;
    (B) a rotatable impeller which is housed in said pump chamber;
    (C) a volute which is housed in said pump chamber; and
    (D) a cover, said cover 1) being fastened to said volute by a volute fasteners accessible from an exterior surface of said cover and 2) being fastened to said pump casing by cover fasteners, wherein said cover fasteners and said volute fasteners can be unfastened independently of one another to selectively 1) permit said cover and said volute to be removed from said pump casing as a unit and 2) permit said cover to be removed from said pump casing while leaving said volute in said pump chamber.

11. A centrifugal trash pump as recited in claim 10, wherein said volute fasteners comprise bolts that extend through bores in said cover and that are threaded into tapped bores in said volute.

12. A centrifugal trash pump as recited in claim 11, wherein said cover fasteners 1) cooperate with notches in said cover and 2) can be loosened and swung away from said notches without removing said cover fasteners from said pump casing, thereby permitting removal of said cover from said pump casing.

13. A method comprising:
    selectively and alternatively 1) removing a cover and a volute from a pump casing as an integral unit in which said cover and said volute are fastened together and 2) removing said cover from said pump casing while leaving said volute in said pump casing.

14. A method as recited in claim 13, further comprising attaching said cover to said volute to form a unit, and then attaching said unit to said pump casing.

15. A method as recited in claim 14, wherein the step of attaching said cover to said volute comprises inserting bolts through said cover from an exterior surface thereof and attaching said bolts to said volute.

16. A method as recited in claim 14, wherein the step of attaching said unit to said pump casing comprises 1) positioning said unit in an opening in said pump casing, then 2) moving rods that are attached to said pump casing into a position in which said rods extend through notches in said cover, and 3) tightening knobs onto said rods to draw said knobs snugly against said cover.

17. A self-priming centrifugal pump comprising:
    (A) a pump casing which has a pump chamber formed therein;
    (B) a rotatable impeller which is housed in said pump chamber; and
    (C) a volute which is housed in said pump chamber, said volute having 1) an inner radial edge which is at least generally circular and which surrounds said impeller, 2) an outer radial surface which is at least general toroidal in shape, 3) a radial outlet in fluid communication with an outlet of said pump chamber, and 4) a recirculation inlet in fluid communication with said radial outlet, said radial outlet being formed from an outlet of a discharge duct, said discharge duct being dimensioned and configured to discharge a fluid stream from the outlet thereof in a flow pattern that is at least substantially tangential to said inner radial edge, wherein said discharge duct has an inner radial wall having an outer end portion that that extends 1) at least substantially linearly and 2) at least substantially tangentially to said inner radial edge.

18. A pump as recited in claim 17, wherein said discharge duct has an outer radial wall having an outer end portion that that extends 1) at least substantially linearly and 2) at least substantially tangentially to said inner radial peripheral edge.

19. A pump as recited in claim 18, wherein an inner end portion of said outer radial wall of said discharge duct is curved at a radius of curvature that at least substantially matches a radius of curvature of an adjacent portion of said outer radial surface of said volute.

20. A pump as recited in claim 18, wherein said outlet of said discharge duct faces generally upwardly and is inclined downwardly from said inner radial wall of said discharge duct to said outer radial wall of said discharge duct.

21. The pump as recited in claim 17, wherein said outlet of said discharge duct is directed at an angle that deviates no more than 15° from a line that is tangential to said inner radial peripheral edge.

22. The pump as recited in claim 21, herein said outlet of said discharge duct is directed at an angle that deviates no more than 15° from a vertical plane.

23. A pump as recited in claim 17, wherein said recirculation opening is formed in an axial surface of said volute.

24. A pump as recited in claim 17, further comprising a baffle that extends outwardly from said outer radial wall of said volute at a location between said discharge duct and said recirculation opening.

25. A pump as recited in claim 17, wherein said pump is a trash pump which is dimensioned and configured to pump a liquid having solids dispersed therein.

26. A pump as recited in claim 17, wherein said discharge duct extends at least generally upwardly from an inlet thereof to an outlet thereof.

27. A self-priming centrifugal trash pump comprising:
   (A) a pump casing which has a pump chamber formed therein, said pump chamber having an inlet and an outlet;
   (B) a rotatable impeller which is housed in said pump chamber; and
   (C) a volute which is removably installed in said pump chamber so as to surround said impeller, said volute having 1) an inner radial edge that is at least generally circular, 2) an outer radial surface that is at least general toroidal, 3) an axial inlet in fluid communication with said inlet of said pump chamber, 4) a radial outlet in fluid communication with said outlet of said pump chamber, and 5) a recirculation inlet in fluid communication with said radial outlet, said radial outlet being formed from an outlet of a discharge duct of said volute, said discharge duct being dimensioned and configured to discharge fluid from an outlet thereof in a flow pattern that is at least substantially tangential to said inner radial edge, wherein said discharge duct has inner and outer radial walls, each of which has an outer end portion which extends 1) at least substantially linearly and 2) at least substantially tangentially to said inner radial edge.

28. A method a recited in claim 27, further comprising removing said volute, including said discharge duct, from said pump as a unit and cleaning said pump.

29. A method as recited in claim 28, wherein said volute is fastened to a cover by fasteners that extend through said cover from an external surface thereof, and wherein the removing step comprises removing both said cover and said volute.

30. A method as recited in claim 29, wherein the removing step comprises removing said cover and said volute as an integral unit without removing said fasteners.

31. A method as recited in claim 29, where in the removing step comprises removing said fasteners and then removing said cover and said volute as separate components.

32. A pump as recited in claim 27, wherein said discharge duct extends at least generally upwardly from an inlet thereof to an outlet thereof.

33. A method comprising:
   (A) drawing a fluid stream at least substantially axially into an impeller of a centrifugal pump, the liquid having a substantial volume of air entrained therein;
   (B) forcing said fluid stream through a volute that surrounds said impeller, said volute having an inner radial edge that is at least substantially circular and having an outer radial surface that is at least generally toroidal;
   (C) directing said fluid stream into and through a discharge duct of said volute so as to convert flow which is primarily circular at an inlet of said discharge duct to flow which is at least primarily tangential to said inner radial edge at an outlet of said discharge duct, wherein said discharge duct has an inner radial wall having an outer end portion that that extends 1) at least substantially linearly and 2) at least substantially tangentially to said inner radial edge, said inner radial wall redirecting fluid flowing therepast from said at least primarily circular flow to said at least primarily tangential flow.

34. A method as recited in claim 33, further comprising
   1) recirculating a portion of the discharged fluid stream to a recirculation inlet of said volute, the recirculated portion of the discharged fluid stream entraining substantially less air than the discharged fluid stream,
   2) combining the recirculated portion of the discharged fluid stream with a stream of incoming fluid axially entering said impeller, the incoming fluid stream having more entrained air than the recirculated portion of the discharged fluid stream, and
   3) directing the combined fluid stream through said discharge duct so as to convert flow which is primarily circular at the inlet of said discharge duct to flow which is at least primarily tangential to said inner radial edge at the outlet of said discharge duct.

35. A method as recited in claim 34, further comprising repeating the recirculating, combining, and directing steps until the recirculated portion of the discharged fluid stream is at least substantially free of discharged air.

36. A method as recited in claim 33, wherein the recirculated portion of the discharged fluid stream comprises part of a larger portion of the discharged fluid stream that flows around said volute after being discharged from said discharge duct, and further comprising separating the larger portion into an outer radial portion that is relatively heavily-laden with entrained air and an inner radial portion that is relatively free of with entrained air and that forms the recirculated portion of the discharged fluid stream.

37. A method as recited in claim 33, further comprising selectively and alternatively 1) removing a cover and a volute from a pump casing as an integral unit in which said cover and said volute are fastened together and 2) removing said cover from said pump casing while leaving said volute in said pump casing.

38. A method as recited in claim 33, wherein said discharge duct extends generally upwardly from an inlet thereof has an outer radial wall which has an outer end portion which extends 1) at least substantially linearly and 2) at least substantially tangentially to said inner radial edge.

* * * * *